United States Patent
Weeber et al.

(10) Patent No.: US 10,778,483 B2
(45) Date of Patent: Sep. 15, 2020

(54) DEVICE FOR OPERATING AN ELECTRICAL CONSUMER, CONSUMER AND METHOD

(71) Applicant: Robert Bosch GmbH, Stuttgart (DE)

(72) Inventors: Volker Weeber, Lauffen A. N. (DE); Ruben Obenland, Grossbottwar (DE); Stefan Hoess, Hessigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/532,721

(22) Filed: Aug. 6, 2019

(65) Prior Publication Data

US 2020/0059389 A1 Feb. 20, 2020

(30) Foreign Application Priority Data

Aug. 15, 2018 (DE) .......................... 10 2018 213 749

(51) Int. Cl.
*H04L 27/20* (2006.01)
*H02P 7/29* (2016.01)
*F16K 31/06* (2006.01)

(52) U.S. Cl.
CPC .............. *H04L 27/20* (2013.01); *F16K 31/06* (2013.01); *H02P 7/29* (2013.01)

(58) Field of Classification Search
CPC ...................................................... H04L 27/20
USPC .......................................................... 375/308
See application file for complete search history.

(56) References Cited

U.S. PATENT DOCUMENTS

| | | | |
|---|---|---|---|
| 6,168,348 B1* | 1/2001 | Meyer | E02F 3/7663 404/84.1 |
| 2005/0057099 A1* | 3/2005 | Flock | H05K 7/1432 307/10.1 |
| 2012/0201066 A1* | 8/2012 | Dubois | H02J 9/066 363/127 |
| 2017/0005581 A1* | 1/2017 | Fukumasu | H02M 3/28 |
| 2017/0331367 A1* | 11/2017 | Kubouchi | H02M 3/158 |
| 2018/0269783 A1* | 9/2018 | Yin | H02M 3/04 |

* cited by examiner

*Primary Examiner* — Lihong Yu
(74) *Attorney, Agent, or Firm* — Norton Rose Fulbright US LLP; Gerard Messina

(57) ABSTRACT

A device for operating an electrical consumer, in particular a solenoid valve, including at least one first circuit which encompasses an activatable first switch and a first freewheeling unit connected or connectable in parallel to the consumer, and including a control unit which is designed for activating the first switch in order to energize the consumer with a predefinable electric current with the aid of pulse width modulation. It is provided that the circuit encompasses at least one second switch and one second freewheeling unit, which is connected or connectable in parallel to the consumer, and that the control unit is designed for activating the second switch in a phase-shifted manner with respect to the first switch in order to energize the consumer.

11 Claims, 2 Drawing Sheets

DEVICE FOR OPERATING AN ELECTRICAL CONSUMER, CONSUMER AND METHOD

CROSS REFERENCE

The present application claims the benefit under 35 U.S.C. § 119 of German Patent Application No. DE 102018213749.8 filed on Aug. 15, 2018, which is expressly incorporated herein by reference in its entirety.

FIELD

The present invention relates to a device for operating an electrical consumer, in particular a solenoid valve, including at least one circuit which encompasses an activatable first switch and a first freewheeling unit connected or connectable in parallel to the consumer, and including a control unit which is designed for activating the first switch in order to energize the consumer with a predefinable electric current with the aid of pulse width modulation.

Moreover, the present invention relates to an electrical consumer, in particular a magnetic hydraulic valve for a motor vehicle, including such a device, and to a method for operating such a device or such a consumer.

BACKGROUND INFORMATION

In control units which are utilized in motor vehicles, for example, in ABS or ESP systems, application-specific integrated circuits, so-called ASICs, are frequently utilized in order to supply electrical loads or consumers, in particular solenoids for hydraulic valves, with a defined current. The current through the electrical loads is usually adjusted in that the ASICs apply, at a predefined frequency, the DC voltage, which is available to the system, to the load or to the consumer and disconnect the DC voltage again. Due to the inductive portion of the electrical load, the current through the load increases as soon as the voltage is applied, and the current decreases again as soon as the voltage is disconnected again. In order to ensure a rapid voltage drop in the disconnected state, a freewheeling unit, for example, in the form of a passive freewheeling diode, is connected in parallel to the load. Once a suitable switching frequency has been reached, a relatively constant direct current having a low alternating component flows through the load or the consumer. This activation method is also referred to as pulse width modulation. Depending on the design of the ASIC, different frequencies and, thereby, different current values are achievable. Usually, the ASICs are designed so that they may achieve a frequency in the range from 4,000 through 10,000 hertz. The remaining alternating component of the set current may result in vibrations, however, which are acoustically perceptible. If the ASIC operates at a constant frequency, a persistent whistling sound may arise, which may also be audible, for example, by occupants of a motor vehicle. Therefore, it is known to vary the switching frequency in the case of ASICs, in order to avoid the whistling sound. In many applications, however, an audible noise may remain. In order to avoid this as well, the ASIC would have to be operated at a higher frequency.

SUMMARY

An example device according to the present invention may have the advantage that, due to the utilization of existing ASICs including a simple expansion, the noise emission of the consumer is reduced or improved without the need to develop an ASIC encompassing a switch, which makes a frequency possible, which goes beyond the usual frequencies. Rather, it is cost-effectively made possible that, due to the utilization of identical components, an ASIC may be operated at a frequency that is twice as high as the frequency which is usually made possible with the aid of an ASIC.

According to the present invention, this may be achieved due to the fact that at least one second switch and one second freewheeling unit, which is connected or connectable in parallel to the consumer, is present, and that the control unit is designed for activating the second switch, in a phase-offset manner with respect to the first switch, in order to energize the load. Due to the phase-shifted activation, it is made possible to double the overall frequency of the device, in particular when the phase shift of the second switch with respect to the first switch is 180°. If multiple further switches are provided, it is theoretically possible to further multiply the overall frequency. In this case, the phase shift is selected in such a way that, overall, a uniform duty cycle is set.

Preferably, at least one diode, in particular a decoupling diode, is connected in series between the consumer and the particular switch. As a result, it is ensured that a short circuit does not arise when one of the two switches is in freewheeling mode while the other switch is switched on.

Moreover, it is preferably provided that the freewheeling units connected or connectable in parallel are designed as active freewheeling diodes of a MOSFET switch. The active freewheeling diode is therefore actively switched on by the MOSFET during the freewheeling phase in order to reduce the power loss of the device. The above-described diodes are present in this specific embodiment, in particular.

Alternatively, the particular freewheeling unit is preferably designed as a passive freewheeling diode, the power loss of the device then increasing, however. As an advantage, a lower cost results, however. In this specific embodiment, the above described (decoupling) diodes are preferably dispensed with.

An example electrical consumer according to the present invention may also yield the aforementioned advantages. In particular, the consumer is designed as a solenoid valve, preferably as a magnetic hydraulic valve for a motor vehicle.

An example method according to the present invention for operating the device or the electrical consumer may be distinguished by the fact that the switches may be activated in a phase-shifted manner with respect to one another. This yields the aforementioned advantages. In particular, the switches are activated in a phase-shifted manner in such a way that the current profile of the consumer has a uniform duty cycle.

Preferably, the switches are activated in such a way that, at the beginning of an energizing process of the consumer, the switches are initially activated simultaneously and, only after an increasing time period, are activated in a manner offset with respect to one another in the phase. As a result, it is possible that a cautious approach to an optimal phase shift of the frequency is made possible.

Preferably, the switches are activated at a different frequency, in particular from the outset, in order to achieve offset phases. As a result, the phase shift enlarges with each cycle until the switches are activated uniformly with respect to one another or temporally equidistantly with respect to one another, so that a uniform duty cycle results at the current output of the device or in the consumer.

It is particularly preferred when the switches are operated further at the same frequency upon reaching a phase shift of 180°. Therefore, as soon as a phase shift of 180° has been reached, the frequencies of the ASICs are matched to each other in such a way that they have the same value. As a result, a continued operation of the device with a uniform duty cycle is reliably ensured. The phase shift of 180° is selected, in particular, when the device utilizes two switches which make the overall duty cycle or the overall current available for the consumer. If more than two switches are present, the switches are offset with respect to one another depending on the number of switches in the phase, so that a uniform output signal of the device or a uniform duty cycle of the output current is ensured.

According to a preferred refinement of the present invention, the freewheeling units connected in parallel to the consumer are actively switched. For this purpose, the freewheeling units include, in particular, MOSFET switches encompassing an active freewheeling diode. This yields the aforementioned advantages.

Further advantages and preferred features and combinations of features result, in particular, from the description herein of example embodiments of the present invention. The present invention is to be explained in greater detail below with reference to the figures.

DETAILED DESCRIPTION OF EXAMPLE EMBODIMENTS

Figure 1:
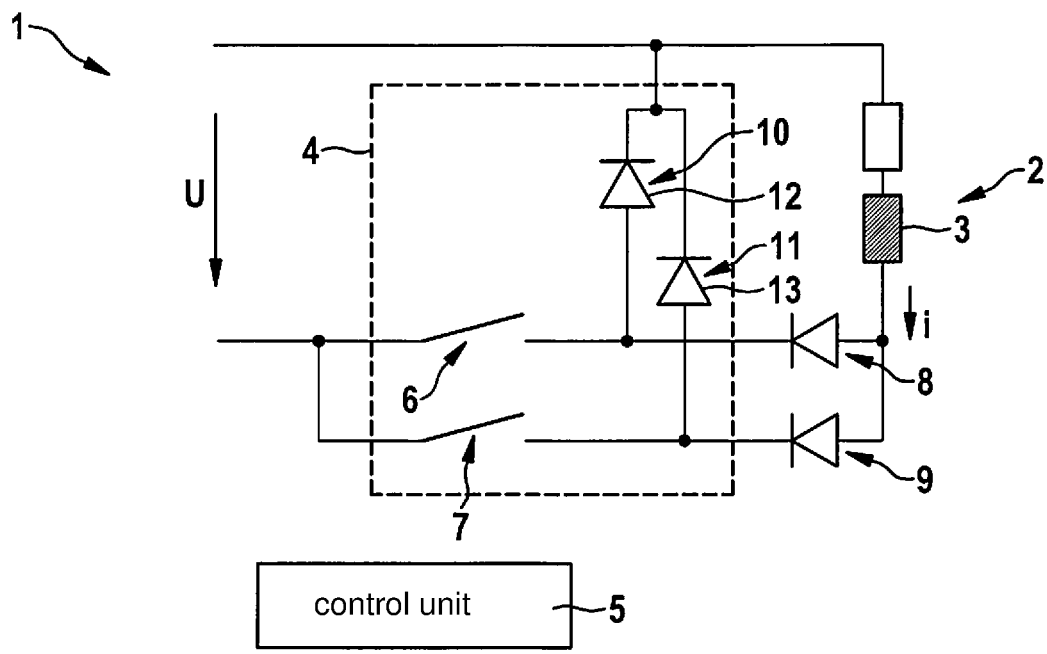
FIG. 1 shows a simplified representation of a device for operating an electrical consumer according to one exemplary embodiment.

FIG. 1 shows, in a simplified representation, a device 1 for operating an electrical consumer 2. In this case, the electrical consumer is a coil 3 of a solenoid valve (not represented here in greater detail), which is energizable in order to actuate the solenoid valve. Device 1 encompasses an application-specific circuit 4 (ASIC) which is activated with the aid of a control unit 5, which may also be a component of the ASIC or circuit 4, in order to actuate the solenoid valve or consumer 2.

Circuit 4 encompasses a first switch 6 and a second switch 7 which are actuatable with the aid of control unit 5 in order to connect consumer 2 to a DC voltage source U. Switches 6, 7 are connected in parallel to one another and in series to consumer 2. Optionally, a diode 8 or 9, for example, as a decoupling diode, is also connected in series between particular switch 6, 7, respectively, and the load or consumer 2. The diode ensures that a short circuit does not arise when one of the switches 6, 7 is closed and the other switch is open.

Moreover, circuit 4 encompasses a first freewheeling unit 10 and a second freewheeling unit 11, each of which is connected in parallel to consumer 2 or to the load of consumer 2. In this case, freewheeling unit 10 is connected between first switch 6 and first diode 8, and freewheeling unit 11 is connected between second switch 7 and second diode 9. According to the present exemplary embodiment, freewheeling units 10, 11 are designed as passive freewheeling diodes.

Therefore, circuit 4 encompasses two channels, via which consumer 3 is energizable. Switches 6, 7 may be actuated independently of one another with the aid of control unit 5.

In this case, control unit 5 is designed for activating switches 6, 7 in a phase-shifted manner with respect to one another in such a way that consumer 2 is uniformly energized at a high frequency. For this purpose, switches 6, 7 are operated at the same frequency, for example, 10 kHz, although with a phase shift of 180°, as is to be explained in greater detail with reference to FIG. 2. In particular, switches 6, 7 are activated with a pulse width ratio reduced by 50%.

Figure 2:
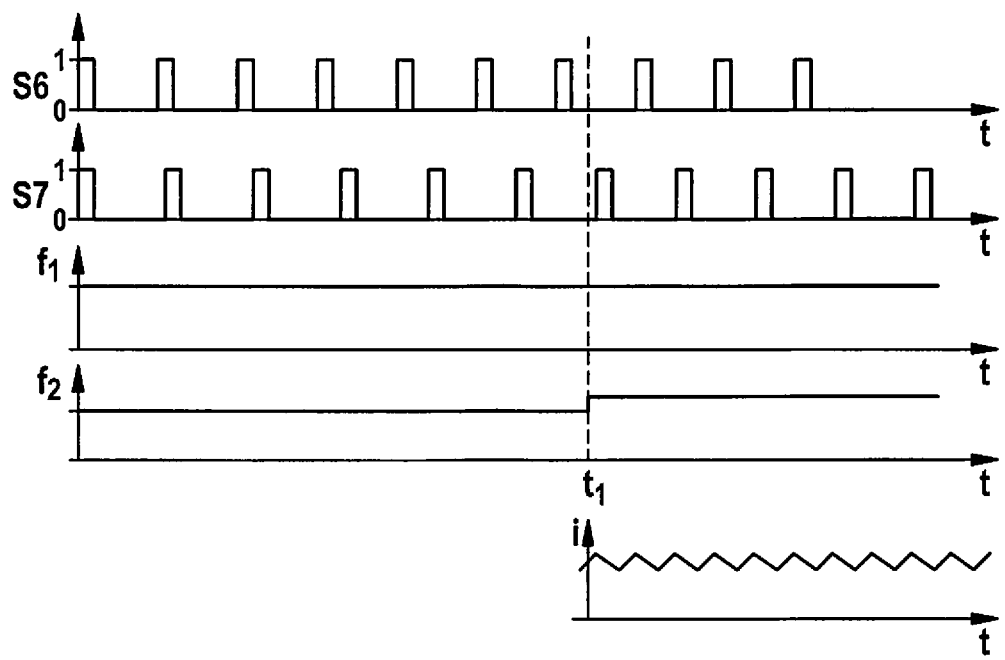
FIG. 2 shows the switching states in a diagram.

FIG. 2 shows, plotted in a diagram with respect to time t, switching states S6 and S7 of switches 6, 7 (1=on, 0=off), frequencies $f_1$ and $f_2$ at which switches 6, 7 are operated, as well as output current i of overall device 1, which benefits consumer 2.

Due to the fact that switches 6, 7 are jointly activated by control unit 5, the sampling frequencies of switches 6, 7 may be synchronized with one another. The desired phase shift is preferably achieved, in this case, due to the fact that the two switches 6, 7 start up synchronously at the beginning of the current build-up in the electrical load, but are operated for a short time at different frequencies as shown in FIG. 2, so that the phase shift continuously becomes greater. At point in time $t_1$, at which the phase shift has reached 180°, the two switches are operated further at the same frequency $f_1$. Switching time $t_1$ is preferably calculated according to the following relationship:

$$t = \frac{1}{2} * \frac{1}{f_2 - f_{2,start}}$$

where $f_1$ is the frequency of switch 6 and $f_{2,start}$ is the initial frequency of switch 7, the following applying at the beginning: $f_{2,start} < f_1$. Frequency $f_2$ is increased to frequency $f_1$ at point in time $t_1$.

As a result, consumer 2 is uniformly energized at point in time $t_1$ and, in particular, noise development of circuit 4 is avoided.

While, according to the exemplary embodiment of FIG. 1, freewheeling units 10, 11 are designed as passive diodes 12, 13, it is provided according to a further exemplary embodiment that freewheeling units 10, 11 are designed as active freewheeling diodes 14, 15.

Figure 3:
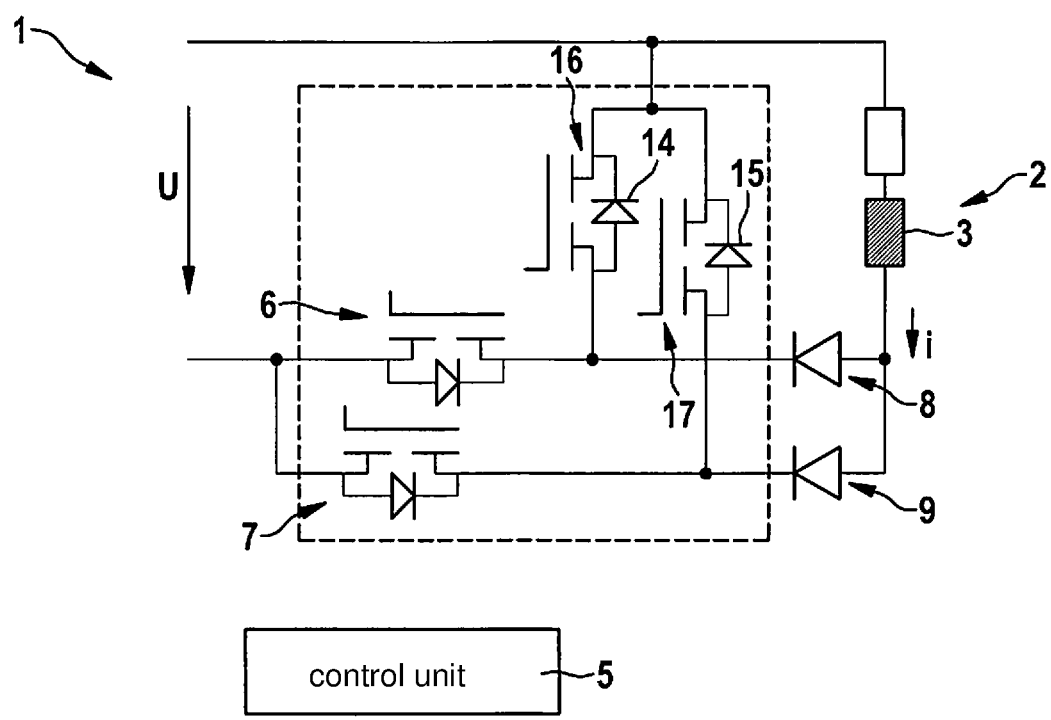
FIG. 3 shows the device according to one further exemplary embodiment.

For this purpose, FIG. 3 shows, by way of example, device 1 which encompasses MOSFET switches 16, 17 instead of freewheeling diodes 12, 13, which are activated with the aid of control unit 5 and each include one of the freewheeling diodes 14, 15, respectively. The advantage of active freewheeling diodes 14, 15 is that the power loss of device 1 is reduced with respect to the preceding exemplary embodiment because, in the case of MOSFETs 16, 17, the voltage drop across freewheeling diodes 14, 15 is considerably less due to a low on-resistance. Diodes 8, 9 are preferably present in this case.

Due to advantageous device 1, it is made possible to double the maximum frequency of the pulse width modulation by providing second switch 7 and second freewheeling unit 11. As a result, it is possible, without a great amount of additional effort, to remove the actuating frequency and the associated vibrations from the range that is audible for a person.

What is claimed is:

1. A device for operating an electrical consumer, comprising:
   at least one first circuit which encompasses an activatable first switch and a first freewheeling unit connected or connectable in parallel to the consumer; and a control unit configured to activate the first switch to energize the consumer with a predefinable electric current using pulse width modulation,
wherein the first circuit includes at least one second switch and one second freewheeling unit, which is connected or connectable in parallel to the consumer, and
wherein the control unit is configured to activate the second switch, in a phase-offset manner with respect to the first switch, to energize the consumer;
wherein control unit is configured to operate the first switch and the second switch further at a same frequency upon reaching a phase shift of 180°.

2. The device as recited in claim 1, wherein the electrical consumer is a solenoid valve.

3. The device as recited in claim 1, wherein a diode is connected in series between the consumer and each of the first switch and the second switch.

4. The device as recited in claim 1, wherein the first freewheeling unit and the second freewheeling unit each include an active freewheeling diode, respectively, of a MOSFET.

5. The device as recited in claim 1, wherein each of the first freewheeling unit and the second freewheeling unit is a passive freewheeling diode.

6. An electrical consumer, comprising:
an electrical solenoid valve for a motor vehicle; and
a device for operating an electrical solenoid valve, the device including:
at least one first circuit which encompasses an activatable first switch and a first freewheeling unit connected or connectable in parallel to the electrical solenoid valve; and
a control unit configured to activate the first switch to energize the electrical solenoid valve with a predefinable electric current using pulse width modulation,
wherein the first circuit includes at least one second switch and one second freewheeling unit, which is connected or connectable in parallel to the electrical solenoid valve, and
wherein the control unit is configured to activate the second switch, in a phase-offset manner with respect to the first switch, to energize the electrical solenoid valve; and
wherein control unit is configured to operate the first switch and the second switch further at a same frequency upon reaching a phase shift of 180°.

7. The electrical consumer as recited in claim 6, wherein the electrical solenoid valve is a hydraulic valve.

8. A method for operating a device, the method comprising:
providing at least one first circuit which encompasses an activatable first switch and a first freewheeling unit connected or connectable in parallel to the consumer;
providing a control unit configured to activate the first switch to energize the consumer with a predefinable electric current using pulse width modulation, wherein the first circuit includes at least one second switch and one second freewheeling unit, which is connected or connectable in parallel to the consumer, and wherein the control unit is configured to activate the second switch, in a phase-offset manner with respect to the first switch, to energize the consumer; and
activating, by the control unit, the first switch and the second switch in a phase-shifted manner with respect to one another;
wherein, at a beginning of an energizing process of the consumer, the first switch and the second switch are activated simultaneously and, as a time period increases, are activated in a manner offset with respect to one another in phase.

9. The method as recited in claim 8, wherein the first switch and the second switch are activated at a different frequency to achieve the offset phase.

10. A method for operating a device, comprising:
providing at least one first circuit which encompasses an activatable first switch and a first freewheeling unit connected or connectable in parallel to the consumer
providing a control unit configured to activate the first switch to energize the consumer with a predefinable electric current using pulse width modulation, wherein the first circuit includes at least one second switch and one second freewheeling unit, which is connected or connectable in parallel to the consumer, and wherein the control unit is configured to activate the second switch, in a phase-offset manner with respect to the first switch, to energize the consumer; and
activating, by the control unit, the first switch and the second switch in a phase-shifted manner with respect to one another;
wherein the first switch and the second switch are operated further at a same frequency upon reaching a phase shift of 180°.

11. The method as recited in claim 10, wherein the first freewheeling unit and the second freewheeling unit connected in parallel are actively switched.

* * * * *